United States Patent [19]

Awazu, deceased et al.

[11] Patent Number: 4,764,301
[45] Date of Patent: Aug. 16, 1988

[54] PHOSPHOR

[75] Inventors: Kenzo Awazu, deceased, late of Nishinomiya, by Setsuko Awazu, legal representative; Kazu Matsunaga; Noritsuna Hashimoto, both of Amagasaki, all of Japan

[73] Assignee: Mitsubishi Denki Kabushiki Kaisha, Tokyo, Japan

[21] Appl. No.: 18,442

[22] Filed: Feb. 25, 1987

[30] Foreign Application Priority Data

Feb. 25, 1986 [JP] Japan .................................. 61-39604

[51] Int. Cl.$^4$ ............................................. C09K 11/81
[52] U.S. Cl. ............................................... 252/301.4 P
[58] Field of Search .................................. 252/301.4 P

[56] References Cited

U.S. PATENT DOCUMENTS 4,423,349  12/1983  Nakajima et al. .................. 313/487

FOREIGN PATENT DOCUMENTS 59-226088  12/1984  Japan .......................... 252/301.4 P
60-90287   5/1985   Japan .......................... 252/301.4 P
2124243    2/1984   United Kingdom .......... 252/301.4 P Primary Examiner—Jack Cooper
Attorney, Agent, or Firm—Oblon, Fisher, Spivak, McClelland & Maier

[57] ABSTRACT

A phosphor excellent in its temperature-versus-luminance characteristics, which is represented by the following formula:

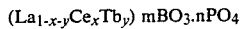

$$(La_{1-x-y}Ce_xTb_y) mBO_3 \cdot nPO_4$$

(where: $0.15 \leq x \leq 0.45$; $0.1 \leq y \leq 0.2$; and $0.01 \leq m/(m+n) \leq 0.045$).

2 Claims, 3 Drawing Sheets

PHOSPHOR

BACKGROUND OF THE INVENTION

1. Field of the Invention

This invention relates to a phosphor which emits green light by irradiation of ultraviolet rays produced by a low pressure mercury vapor discharge lamp. More particularly, it is concerned with such a phosphor which is excellent in its temperature-versus-luminance characteristics.

2. Discussion of Background

In recent years, there has been made much use of the so-called "3-band light emitting type fluorescent lamp" having high operating efficiency and high color-rendering property in comparison with white fluorescent lamp for general lighting purpose. This type of fluorescent lamp utilizes a mixture of three kinds of phosphors which emit lights in blue, green and red, each having a narrow band of the light emission. Hence, efforts are being made for each and every phosphor to improve its light emitting efficiency, to optimize its light emitting spectrum, and, so forth. Since the green-emitting phosphor has the main wavelength of its light emitting spectrum in the region of the highest luminous efficiency, the light emitting efficiency of it greatly influences on the brightness of the lamp. For this reason, studies and researches have been conducted in various aspects concerning improvement in the properties of the (La, Ce, Tb)PO$_4$ phosphor which is one of the green-emitting phosphors for the 3-band fluorescent lamp. According to Japanese Unexamined Patent Publication No. 56086/1979, for example, the emission intensity is said to increase by sub-stitution of gadolinium (Gd) and yttrium (Y) for a part of lanthanum (La). Also, Japanese Unexamined Patent Publication No. 23674/1982 discloses that the emission intensity of the (La, Ce, Tb)PO$_4$ phosphor reaches its maximum with a substituting quantity of cerium (Ce) in a range of from 0.6 to 0.8 mole.

However, such phosphors have in general their optimum condition for the emission intensity in the vicinity of room temperature, but no consideration has been given on their temperature characteristics.

In recent years, small-sized fluorescent lamps are being widely used in place of incandescent lamps. Such small-sized fluorescent lamps have a high load on their tube wall in comparison with those conventional straight or circular tube type fluorescent lamps. Thus, the temperature of the tube wall of these small-sized fluorescent lamps reaches as high as 100° C. or above. Accordingly, the temperature of the phosphor layer coated on the inner surface of the tube wall becomes much higher. It has been well known that, in the aforementioned (La, Ce, Tb)PO$_4$ green-emitting phosphor, when cerium (Ce) is in a high concentration, the temperature-versus-luminance characteristics of it becomes considerably deteriorated. Even if the concentration of Ce is reduced, there occurs extinction of light at 150° C. or above.

A curve (II) in the graphical representation of FIG. 1 of the accompanying drawing shows the temperature-versus-luminance characteristics of the phosphor composed of (La$_{0.62}$Ce$_{0.20}$Tb$_{0.18}$)PO$_4$, wherein the light extinction is seen to have taken place at a temperature of 150° C. and above. Accordingly, when the above-mentioned conventional (La, Ce, Tb)PO$_4$ phosphor is used as the green component for the small-sized fluorescent lamp, the lamp reduces its luminance or discolors as the temperature on the tube wall rises with passage of time after lighting.

With a view to solving the various problems as mentioned above, the present inventors have conducted extensive studies and researches, as the result of which they have found a green-emitting phosphor which is excellent in its temperature-versus-luminance characteristics. It brings about no decrease in the emission intensity at the room temperature, and no extinction of light even in the temperature region of 350° C.

SUMMARY OF THE INVENTION

It is therefore the primary object of the present invention to provide an improved phosphor for particular use in the low pressure mercury vapor discharge lamp having excellent temperature-versus-luminance characteristics.

According to the present invention, in general aspect of it, there is provided a phosphor which is represented by the following general formula:

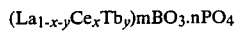

$(La_{1-x-y}Ce_xTb_y)mBO_3 \cdot nPO_4$ (where: $0.15 \leq x \leq 0.45$; $0.1 \leq y \leq 0.2$; and $0.01 \leq m/(m+n) \leq 0.045$).

The foregoing object, other objects as well as specific composition of the phosphor according to the present invention will become more apparent and understandable from the following detailed description thereof, when read in conjunction with several preferred examples thereof and the accompanying drawings.

DETAILED DESCRIPTION OF PREFERRED EMBODIMENTS

Figure 1:
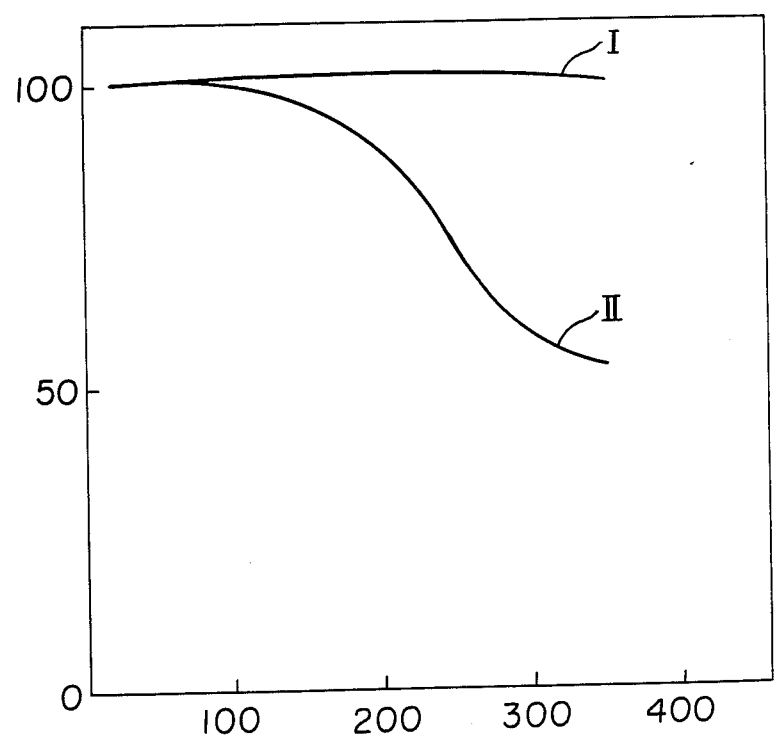
FIG. 1 is a graphical representation showing the temperature-versus-luminance characteristics of bot phosphor according to the present invention and conventional (La, Ce, Tb)PO$_4$ green-emitting phosphor, which are excited by the ultra-violet rays produced by the low pressure mercury vapor discharge.

In the following, the present invention will be described in more detail.

The phosphor according to the present invention is of the type having boric acid (BO$_3$) contained in the above-mentioned (La, Ce, Tb)PO$_4$ phosphor in a manner to satisfy the above-mentioned compositional relationship.

The (La, Ce, Tb)PO$_4$ phosphor, with a part of its phosphoric acid group having been substituted with the boric acid group, has already been known from, for example, Japanese Unexamined Patent Publication No. 20378/1984. In this case, however, the content of the boric acid group is 0.05 gram atom or above, and the sum of the boric acid group and the phosphoric acid group is stoichiometrical. The object of this publication resides in minimizing the deterioration of the phosphor during its heating process, and the decrease of its luminance due to ultraviolet ray irradiation of 185 nm produced by the electrical discharge of the low pressure mercury vapor. In contrast to this, the sum of the boric acid group and the phosphoric acid group in the phosphor according to the present invention needs not be stoichiometrical, but it is rather at the excess side by about a few percent.

According to the present invention, the temperature-versus-luminance characteristics of the phosphor can be remarkably imporved by substituting a specific quantity of boric acid for a part of the phosphoric acid in the above-mentioned (La, Ce, Tb)PO$_4$ phosphor.

With a view to enabling those persons skilled in the art to put this invention into practice, the following preferred examples are presented. It should, however, be understood that these examples are illustrative only, and not so restrictive, and that various changes and modifications in the component elements and the processing conditions may be made without departing from the spirit and scope of the invention as recited in the appended claims.

EXAMPLE 1

40.40 g of lanthanum oxide (La$_2$O$_3$), 13.46 g of terbium oxide (Tb$_4$O$_7$), and 34.74 g of cerium nitrate (Ce(NO$_3$)$_3$.6H$_2$O) were dissolved into a solution prepared by adding 84 ml of 70% conc. nitric acid (HNO$_3$) to approximately 2 liters of pure water, and the mixture solution was maintained at a temperature of 85° C. Separately, an aqueous solution prepared by dissolving 84 g of oxalic acid (H$_2$C$_2$O$_4$.2H$_2$O) into approximately 2 liters of pure water was maintained at 85° C. To the aqueous solution of oxalic acid, there was gradually poured the above-mentioned aqueous solution of nitric acid at 85° C. to obtain a white precipitate of oxalate. After this precipitate was filtered and dried, it was baked and decomposed for two hours at 600° C. in the atmospheric air to obtain a solid-solution of the oxides of La, Tb and Ce. Then, 44.96 g of 85% conc. phosphoric acid (H$_3$PO$_4$) was gradually added to the thus obtained solid-solution and sufficiently reacted. Then, after the reaction product was dried, it was baked for two hours at a temperature of 1,250° C. in the reducing atmosphere. Subsequently, after the baked product was pulverized, it was added with 0.76 g of ammonium borate ((NH$_4$)$_2$O.5B$_2$O$_3$.8H$_2$O), and again baked for two hours at 1,250° C. in the reducing atmosphere, to obtain a phosphor according to the present invention.

The resulted phosphor was found to have a composition of (La$_{0.62}$Ce$_{0.20}$Tb$_{0.18}$) 0.035BO$_3$ 0.975PO$_4$, and its temperature-luminance characteristic due to excitation by the ultraviolet rays produced by the electric discharge of the low pressure mercury vapor, as measured, was as indicated by a curve (I) in FIG. 1. With the above-mentioned conventional green-emitting phosphor (La, Ce, Tb)PO$_4$, there emerged lowering in its emission intensity at a temperature of 150° C. or above as shown by a curve (II) in FIG. 1. In contrast to this, with the phosphor according to the present invention, no lowering of the emission intensity was observed at all even at a temperature of 150° C. or above, moreover substantially constant emission intensity could be maintained up to a temperature of 350° C. Also, the emission intensity at room temperature did not decrease due to substitution by boric acid, whereby both chromaticity and luminance could be maintained at a level which was equal to, or even higher than, those of the conventional phosphor. Further, upon examination of its X-ray diffraction pattern, it indicated the monazite crystal structure similar to that of the above-mentioned (La, Ce, Tb)PO$_4$, but no change could be recognized in the crystallographic structure due to the substitution by boric acid.

Figure 2:
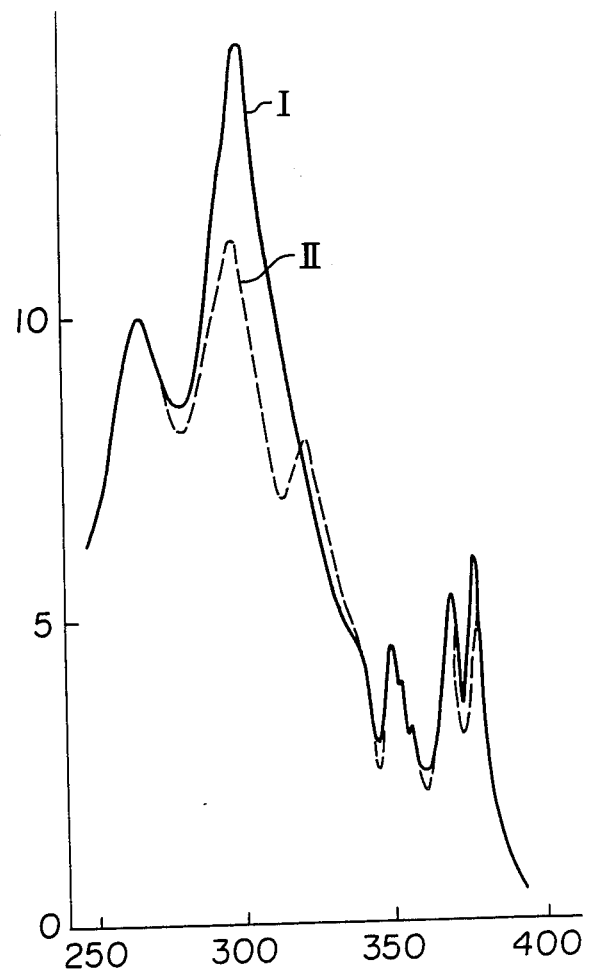
FIG. 2 is a diagram of excitation spectrum of the phosphor according to the present invention.
Figure 3:
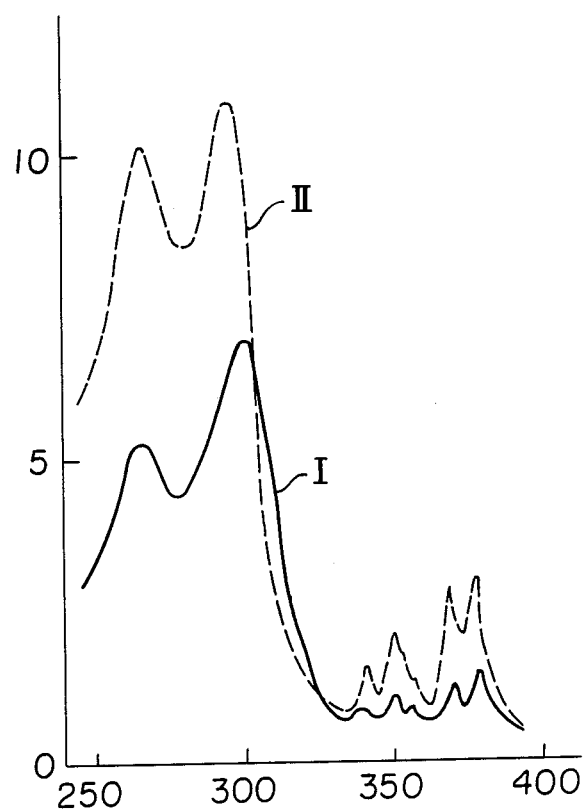
FIG. 3 is also a diagram of the excitation spectrum of the conventional green-emitting phosphor.

Then, the excitation spectra of the phosphor of this example were measured at room temperature and 200° C., respectively. Also, the excitation spectra of the above-mentioned conventional green-emitting phosphor were measured at room temperature and 200° C., respectively. The results of the measurements are as shown in FIGS. 2 and 3, respectively. It is seen from these spectral diagrams that the conventional phosphor reduced its excitation intensity to approximately one half at the main wavelength of the ultraviolet rays of 254 nm produced by the low pressure mercury vapor discharge at 200° C. In contrast to this, the phosphor of this invention maintained its excitation intensity at the main wavelength of 254 nm same level at both room temperature and 200° C. From the facts that there took place no decrease in luminance and no light extinction at temperature as high as 200° C., and that the excitation spectrum becomes distinctly different at a high temperature level, it may be inferred that the boric acid apparently constitutes a part of the host of this phosphor substance, and hence contributes to improvement in the temperature-versus-luminance charcteristics.

EXAMPLE 2

40.40 g of lanthanum oxide, 13.46 g of terbium oxide, 13.77 g of cerium oxide (CeO), and 51.48 g of diammonium hydrogen phosphate ((NH$_4$)$_2$HPO$_4$) were mixed, and the mixture was heated for baking 30 min. at a temperature of 700° C. in the atmosphere. After cooling the baked product, it was pulverized and mixed with 0.76 g of ammonium borate, and baked at 1,250° C. for one hour in the reducing atmosphere. After cooling the baked product, it was pulverized to obtain the intended phosphor. The thus obtained phosphor was seen to have the substantially same temperature-versus-luminance charcteristics as that of the phosphor in Example 1 above.

It should be noted that, in the above-described examples, it was only sufficient if the intended oxide is obtained by the first baking process, in Example 1 above, we can use carbonic acid in place of oxalic acid for the same result. Further, in Example 2, it may be feasible to use other nitrates, oxalates, etc. as the rare earth component materials, and also to use boric acid (H$_3$BO$_3$), etc. in place of ammonium borate.

EXAMPLES 3 TO 10

In the same manner as in Example 1 above, there were obtained phosphors of various contents of boric acid and phosphoric acid as shown in Table 1 below. The Table 1 also indicates the luminance of each of these phosphor as measured.

TABLE 1

| Example | Phosphor | Luminance at room temperature | Luminance at 250° C. |
|---|---|---|---|
| 1 | (La$_{0.62}$ Ce$_{0.20}$ Tb$_{0.18}$) 0.035 BO$_3$ 0.975 PO$_4$ | 105 | 105 |
| 3 | (La$_{0.62}$ Ce$_{0.20}$ Tb$_{0.18}$) 0.025 BO$_3$ 0.975 PO$_4$ | 105 | 102 |

TABLE 1-continued

| Example | Phosphor | Luminance at room temperature | Luminance at 250° C. |
| --- | --- | --- | --- |
| 4 | $(La_{0.62} Ce_{0.20} Tb_{0.18}) 0.030 BO_3 0.975 PO_4$ | 105 | 103 |
| 5 | $(La_{0.62} Ce_{0.20} Tb_{0.18}) 0.045 BO_3 0.975 PO_4$ | 104 | 100 |
| 6 | $(La_{0.62} Ce_{0.20} Tb_{0.18}) 0.005 BO_3 0.995 PO_4$ | 100 | 80 |
| 7 | $(La_{0.62} Ce_{0.20} Tb_{0.18}) 0.015 BO_3 0.985 PO_4$ | 101 | 95 |
| 8 | $(La_{0.62} Ce_{0.20} Tb_{0.18}) 0.035 BO_3 0.965 PO_4$ | 103 | 100 |
| 9 | $(La_{0.62} Ce_{0.20} Tb_{0.18}) 0.045 BO_3 0.955 PO_4$ | 102 | 95 |
| 10 | $(La_{0.62} Ce_{0.20} Tb_{0.18}) 0.055 BO_3 0.945 PO_4$ | 98 | 85 |
| Comparative Example | $(La_{0.62} Ce_{0.20} Tb_{0.18}) PO_4$ | 100 | 70 |

From the results shown in Table 1 above, it may be seen that boric acid had better be present at a gram atomic from 0.01 to 0.045, and phosphoric acid should preferably be in a range of from 0.955 to 0.985 gram atomic. Particularly preferred values may be 0.035 gram atomic of boric acid and 0.975 gram atomic of phosphoric acid.

EXAMPLES 11 TO 21

In the same manner as in Example 1 above, there were obtained the phosphors of various contents of Ce and Tb as shown in Table 2 below. The Table 2 also indicates the luminance of each of these phosphors.

TABLE 2

| Example | Phosphor | Luminance at room temperature | Luminance at 250° C. |
| --- | --- | --- | --- |
| 1 | $(La_{0.62} Ce_{0.20} Tb_{0.18}) 0.035 BO_3 0.975 PO_4$ | 105 | 105 |
| 11 | $(La_{0.72} Ce_{0.10} Tb_{0.18}) 0.035 BO_3 0.975 PO_4$ | 98 | 98 |
| 12 | $(La_{0.67} Ce_{0.15} Tb_{0.18}) 0.035 BO_3 0.975 PO_4$ | 102 | 102 |
| 13 | $(La_{0.57} Ce_{0.25} Tb_{0.18}) 0.035 BO_3 0.975 PO_4$ | 103 | 102 |
| 14 | $(La_{0.47} Ce_{0.35} Tb_{0.18}) 0.035 BO_3 0.975 PO_4$ | 102 | 100 |
| 15 | $(La_{0.87} Ce_{0.45} Tb_{0.18}) 0.035 BO_3 0.975 PO_4$ | 100 | 97 |
| 16 | $(La_{0.82} Ce_{0.50} Tb_{0.18}) 0.035 BO_3 0.975 PO_4$ | 100 | 85 |
| 17 | $(La_{0.75} Ce_{0.20} Tb_{0.05}) 0.035 BO_3 0.975 PO_4$ | 80 | 78 |
| 18 | $(La_{0.70} Ce_{0.20} Tb_{0.10}) 0.035 BO_3 0.975 PO_4$ | 98 | 97 |
| 19 | $(La_{0.65} Ce_{0.20} Tb_{0.15}) 0.035 BO_3 0.975 PO_4$ | 100 | 100 |
| 20 | $(La_{0.60} Ce_{0.20} Tb_{0.20}) 0.035 BO_3 0.975 PO_4$ | 100 | 100 |
| 21 | $(La_{0.55} Ce_{0.20} Tb_{0.25}) 0.035 BO_3 0.975 PO_4$ | 98 | 97 |

As is apparent from Table 2 above, a favorable result can be obtained from the Ce content of from 0.15 to 0.45 gram atomic and the Tb content of from 0.10 to 0.20 gram atomic.

As described in the foregoing, the present invention is capable of remarkably improving the temperature-versus-luminance characteristics of the (La, Ce, Tb)PO$_4$ phosphor which emits green light by irradiation of the ultraviolet rays, by adding, to a part of its phosphoric acid, the above-mentioned boric acid in an appropriate quantity, whereby a very useful phosphor which can solve the afore-described problems, can be obtained.

What is claimed is:

1. A phosphor having the following formula:

$(La_{1-x-y}Ce_xTb_y)mBO_3 \cdot nPO_4$ wherein $0.15 \leq x \leq 0.45$; $0.1 \leq y \leq 0.2$; m is from 0.01 to 0.045; n is from 0.955 to 0.985 and 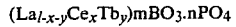 $0.01 \leq m/(m+n) \leq 0.045$ and exhibiting a higher luminance at 250° C. than said phosphor where m is less than 0.01 or greater than 0.045.

2. The phosphor according to claim 1, wherein (m+n) has a value of greater than 1.

* * * * *